US006571580B1

(12) United States Patent
Lodge

(10) Patent No.: US 6,571,580 B1
(45) Date of Patent: Jun. 3, 2003

(54) LIMITED VOLUME INSERT BONDING PROCESS IN A VIAL

(75) Inventor: Daniel A. Lodge, Deerfield Township, NJ (US)

(73) Assignee: Q.I.S., Inc., Rosenhayn, NJ (US)

( * ) Notice: Subject to any disclaimer, the term of this patent is extended or adjusted under 35 U.S.C. 154(b) by 0 days.

(21) Appl. No.: 09/537,444

(22) Filed: Mar. 27, 2000

Related U.S. Application Data

(62) Division of application No. 09/005,391, filed on Jan. 9, 1998, now Pat. No. 6,066,299.

(51) Int. Cl.[7] .......... C03B 23/20
(52) U.S. Cl. .......... 65/58
(58) Field of Search .......... 65/36, 58, 108

(56) References Cited

U.S. PATENT DOCUMENTS

| | | | | |
|---|---|---|---|---|
| 1,486,450 A | | 3/1924 | Peterman | |
| 1,519,034 A | | 12/1924 | Livingston | |
| 1,855,039 A | | 4/1932 | Wetmore | |
| 1,968,263 A | * | 7/1934 | Reuther | 215/12.1 |
| 2,181,240 A | * | 11/1939 | Kimble | 220/560.03 |
| 3,113,831 A | * | 12/1963 | Coale | 215/12.1 |
| 3,232,732 A | * | 2/1966 | Wax | 65/34 |
| 3,247,302 A | * | 4/1966 | Lewis | 215/12.1 |
| 4,054,208 A | | 10/1977 | Lowe | |
| 4,151,923 A | | 5/1979 | Bernardi | |
| 4,243,401 A | * | 1/1981 | Guenthner | 65/109 |
| 4,251,252 A | * | 2/1981 | Frazier | 228/221 |
| 5,150,815 A | | 9/1992 | Saklad | |
| 5,382,409 A | | 1/1995 | Baxter | |
| 5,470,537 A | | 11/1995 | Siegel | |
| 5,769,262 A | | 6/1998 | Yamada et al. | |

OTHER PUBLICATIONS

Wheaton Catalog (1989), pp. 63–64, 312–315 Webster's Ninth New Collegiate Dictionary (Merriam–Webster, Inc., 1987), pp. 500 and pp. 1313, 1987. (No month available).
Kimble Kontes Autosampler Vials '96, 1996, Edition. (No month available).
Chromacol Ltd. Advertisement, LC–GC vol. 15, No. 7 Jul. 1997.

* cited by examiner

*Primary Examiner*—Sean Vincent
(74) *Attorney, Agent, or Firm*—Norman E. Lehrer

(57) ABSTRACT

The present invention discloses a limited volume insert fused within a vial and the process for forming the same. The insert has a conical body, which tapers to a closed bottom, and an open top with a flange around the periphery thereof. The vial may be of the type where screw threads are located on the outer side of the neck of the vial, a reduced neck vial so that a cap may be snapped onto the vial, or a vial with a cap that is crimped onto the vial. The insert is placed within the vial so that the flange rests on the top of the open end of the vial. The flange and the top of the vial are then heated so that the flange reaches a molten state and the top of the vial reaches a submolten state. A tool is used to apply pressure to the now molten flange so that the flange will fuse to the vial. The tool is then removed and the insert is bonded to the vial without interfering with the placement or removal of a cap on the vial. Therefore, the insert may be emptied easily before the vial is disposed of.

9 Claims, 1 Drawing Sheet

LIMITED VOLUME INSERT BONDING PROCESS IN A VIAL

CROSS-REFERENCE TO RELATED APPLICATION

This application is a division of U.S. application Ser. No. 09/005,391, filed Jan. 9, 1998 now U.S. Pat. No. 6,066,299.

BACKGROUND OF THE INVENTION

The present invention is directed toward a chromatography vial and more particularly, toward a limited volume insert fused within the vial and a process for forming the same so that the insert is supported by the vial.

Chromatography vials typically contain limited volume inserts where the insert is secured within the vial, usually by being thermally fused to the top or the neck of the vial. As is well known in the art, the insert carries the sample to be tested while the vial provides support for the insert. There are several advantages to this type of structure as opposed to an insert merely being placed within a vial. For example, because the insert is bonded to the vial, the analyst need not waste time placing the insert within the vial himself and making certain that it is supported. Also, this arrangement allows for uniformity of results and a reduction in costs in that the autosampler may be programmed to extract the maximum amount of sample from each vial because each insert is it at a fixed height within the vial. Furthermore, no part of the sample will be lost between the insert and the vial, thereby avoiding waste and possible cross-contamination.

Another advantage of securing an insert within a vial is that several types of vials may be used with the insert. For example, one type of vial which may be used has screw threads on the neck at its open end so that a cap may be screwed onto the vial. Another type of vial has a reduced diameter neck so that a cap may be snapped onto the vial. Also, the vial may be of the type where an aluminum cap is crimped onto the top.

As much as fusing an insert to a vial has certain advantages there are, however, some problems associated with each type of insert bonded vial described above. For example, the snap on cap type of vials do not seal the vial well for long periods of time, thereby causing inaccurate results. The problem with the crimped on caps is that the caps are difficult to remove. This difficulty becomes a problem because EPA regulations require that the vial be emptied before disposal. Screw threaded vials are easy to open and seal well. However, the insert cannot be thermally fused to the top or neck of the vial using conventional techniques without the threads being distorted and damaged. This damage interferes with the cap's ability to screw onto the vial properly.

U.S. Pat. No. 5,382,409 to Baxter discloses a support for a vial where the support is contoured to fit the tapered shape of the vial so that the vial is friction fit within the support. The problem with this structure, however, is that the support does not fully encase the vial. Therefore, the sample within the vial is not fully protected. That is, sample may be lost between the vial and the support. Also, cross-contamination may occur.

SUMMARY OF THE INVENTION

The present invention is designed to overcome the deficiencies of the prior art discussed above. It is an object of the present invention to provide a limited volume insert bonded within a vial and a process for forming the same so that the vial may be easily emptied and disposed of.

It is a further object of the invention to provide the insert with a flange so that the insert may be heated sealed to the vial without Interfering with the placement and removal of the vial's cap.

In accordance with the illustrative embodiments, demonstrating features and advantages of the present invention, there is provided a limited volume insert bonded within a vial where the insert has a conical body, which tapers to a closed bottom, and an open top with a flange around its periphery.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
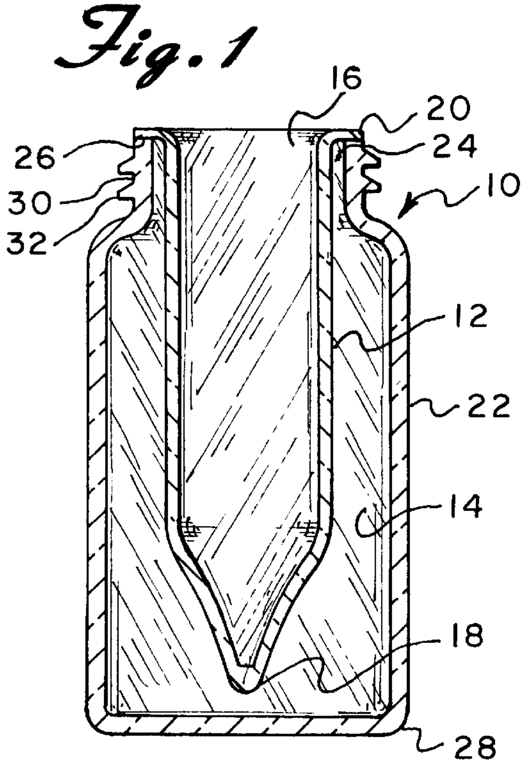
FIG. 1 is a cross-sectional view of the insert within the vial of the present invention.

Referring now to the drawings in detail wherein like reference numerals have been used throughout the various figures to designate like elements, there is shown in FIG. 1 a limited volume insert within a vial constructed in accordance with the principles of the present invention and designated generally as 10.

The insert 12 has a generally 14and an open top 16. The conical body 14 tapers toward the closed bottom 18 which is generally rounded. The open top 16 has a flange 20 extending outwardly in a substantially horizontal plane around the periphery of the open top 16. The flange 20 has a thickness of approximately 0.7 mm. The insert 12 has a capacity of approximately 0.15 to 0.25 ml and is made firm glass, for example, borosilicate glass. The vial 22 is cylindrical and has an opening 24 at the top end 26 and a closed bottom end 28.

Vial 22 is of the type generally used in the art of microsampling. That is, it is a 12×32 mm glass vial with a capacity in the range of approximately 0.5 to 1.8 ml. The neck 30 of the vial 22 may have screw threads 32 so that a cap (not shown) may be screwed onto the vial 22. The vial 22 may also be of the type where the cap snaps onto the vial or where a cap is crimped onto the top of the vial. By way of example, however, the screw top type vial will be described as the vial to be used with the insert of the present invention.

Figure 2:
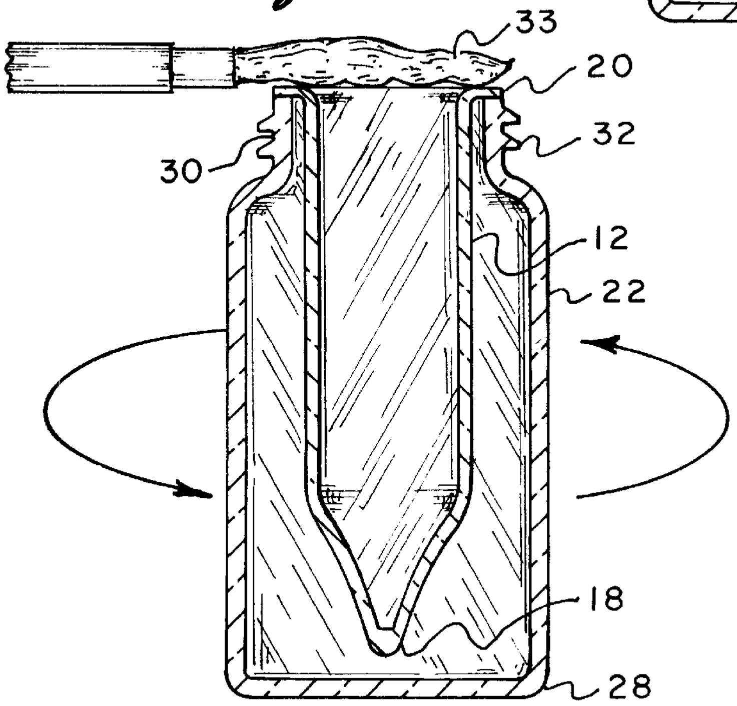
FIG. 2 is a cross-sectional view of the insert and vial being heated preliminary to being secured together.

In order to bond the insert 12 to the vial 22, the insert 12 is placed through the opening 24 of the vial 22, with the flange 20 resting on the top end 26 of the vial 22. (See FIG. 1.) The flange 20 covers most of the glass on the top end 26 of the vial 22. A flame or heating means 33 is then passed across the flange 20 and the top end 26 of the vial 22 while the vial 22 is rotated about its axis. (See FIG. 2.) Heat is applied in this manner for approximately seven seconds at a temperature of approximately 3400° F. so that the flange 20 reaches a molten state and the glass on top of the vial 22 reaches a submolten state.

Figure 3:
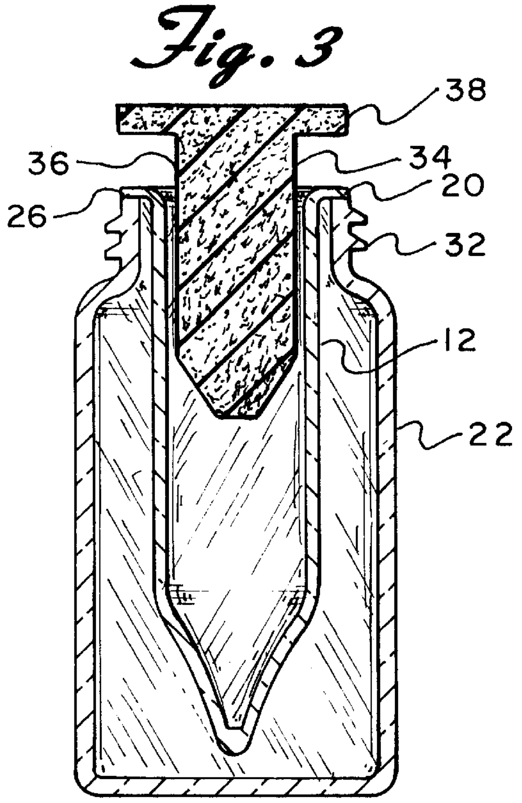
FIG. 3 is a cross-sectional view of the insert being permanently secured to the vial.

A carbon tool 34 with a conical body 36 and a flange 38 extending outwardly therefrom is then placed within the insert 12. (See FIG. 3.) The flange 38 is pressed down onto the molten flange 20 so as to apply approximately one quarter pound of pressure to the molten flange 20. While a conically shaped tool is described, it should be realized that this is by way of example only and any other type of tool may be used as long as It has the capability of delivering at least ¼ lb. of pressure to the molten flange.

After the pressure has been applied, the tool 34 is removed and the glass is allowed to cool. The insert 12 has now been fused to the top end 26 of the vial 22 without distorting the threads 32 of the vial 22 so that a cap may be properly screwed onto the vial 22. In this manner, the cap may be removed in order to fill or empty the insert 12.

The present invention may be embodied in other specific forms without departing from the spirit or essential attributes thereof and accordingly, reference should be made to the appended claims rather than to the foregoing specification as indicating the scope of the invention.

I claim:

1. A process of forming an insert within a vial comprising the steps of:

providing a glass insert having a body with a closed bottom and an open top, said open top having a substantially horizontally extending flange around the periphery of said open top;

providing a glass vial with an open top, a cylindrical body, and a closed bottom end;

inserting said insert within said vial so that said flange rests on said top of said vial;

heating said flange and the top of said vial while the vial is rotated so that said flange is fused onto said vial;

inserting a tool with a conical body and a flange extending outwardly therefrom within said insert so that said flange of said tool rests on said flange of said insert; and applying pressure to said flanges in order to fuse said flange of said insert to said vial.

2. The process of forming an insert within a vial claimed in claim 1 wherein said pressure is at least ¼ lb.

3. The process of forming an insert within a vial as claimed in claim 1 wherein said flange is heated to a molten state.

4. The process of forming an insert within a vial as claimed in claim 1 wherein said top of said vial is heated to a submolten state.

5. The process of forming an insert within a vial as claimed in claim 1 wherein said flange and said top of said vial are heated for approximately seven seconds.

6. The process of forming an insert within a vial as claimed in claim 1 wherein said vial has a neck with screw threads thereon.

7. The process of forming an insert within a vial as claimed in claim 1 wherein said vial has a cylindrical body.

8. The process of forming an insert within a vial as claimed in claim 1 wherein said insert has a conical body which tapers to said closed bottom.

9. The process of forming an insert within a vial as claimed in claim 1 wherein said closed bottom is rounded.

* * * * *